(12) United States Patent
Groeger et al.

(10) Patent No.: US 7,805,230 B2
(45) Date of Patent: Sep. 28, 2010

(54) APPARATUS FOR TRIGGERING PERSONAL PROTECTION MEANS

(75) Inventors: Ulrike Groeger, Howell, MI (US);
Alfred Kuttenberger, Heucnberg (DE);
Marc Theisen, Besigheim (DE);
Michael Bunse, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 903 days.

(21) Appl. No.: 10/574,391

(22) PCT Filed: Jul. 22, 2004

(86) PCT No.: PCT/DE2004/001601

§ 371 (c)(1),
(2), (4) Date: Feb. 8, 2007

(87) PCT Pub. No.: WO2005/044635

PCT Pub. Date: May 19, 2005

(65) Prior Publication Data

US 2007/0162208 A1    Jul. 12, 2007

(30) Foreign Application Priority Data

Oct. 17, 2003    (DE) ............................... 103 48 386

(51) Int. Cl.
*B60R 22/00* (2006.01)
(52) U.S. Cl. .......................... 701/45; 701/48
(58) Field of Classification Search ............... 701/45, 701/48
See application file for complete search history.

(56) References Cited

U.S. PATENT DOCUMENTS

| | | | |
|---|---|---|---|
| 6,721,659 B2 * | 4/2004 | Stopczynski | 701/301 |
| 7,526,369 B2 * | 4/2009 | Sugiura et al. | 701/36 |
| 2003/0051530 A1 | 3/2003 | Eisele et al. | |
| 2003/0069677 A1 | 4/2003 | Boran et al. | |
| 2004/0030476 A1 * | 2/2004 | Oswald et al. | 701/45 |
| 2004/0059487 A1 * | 3/2004 | Lich et al. | 701/45 |
| 2004/0107033 A1 * | 6/2004 | Rao et al. | 701/45 |
| 2005/0096815 A1 * | 5/2005 | Takafuji et al. | 701/45 |
| 2007/0035113 A1 * | 2/2007 | Kuttenberger et al. | 280/735 |
| 2007/0045026 A1 * | 3/2007 | Theisen | 180/274 |
| 2007/0124047 A1 * | 5/2007 | Roelleke | 701/45 |
| 2007/0131468 A1 * | 6/2007 | Bullinger et al. | 180/282 |
| 2007/0162208 A1 * | 7/2007 | Groeger | 701/45 |

FOREIGN PATENT DOCUMENTS

| | | |
|---|---|---|
| DE | 199 57 187 | 5/2001 |
| DE | 101 40 119 | 3/2003 |
| DE | 102 47 670 | 4/2003 |
| EP | 0 914 992 | 5/1999 |
| JP | 2003-137063 | 5/2003 |

* cited by examiner

*Primary Examiner*—Khoi Tran
*Assistant Examiner*—Brian J Broadhead
(74) *Attorney, Agent, or Firm*—Kenyon & Kenyon LLP

(57) ABSTRACT

An apparatus for triggering personal protection means, having a surroundings sensor suite and a contact sensor suite, influences a pedestrian protection algorithm as a function of a first signal of the surroundings sensor suite, and influences a pre-crash algorithm as a function of a second signal of the pedestrian protection algorithm that takes into account a third signal of the contact sensor suite. The apparatus triggers the personal protection means as a function of a fourth signal of the pedestrian protection algorithm and a fifth signal of the pre-crash algorithm.

17 Claims, 2 Drawing Sheets

APPARATUS FOR TRIGGERING PERSONAL PROTECTION MEANS

BACKGROUND INFORMATION

It is described in German Patent Application No. EP 914 992 to provide a pedestrian protection system on vehicles, in which context a front shroud is erected in the event of an impact with a pedestrian.

SUMMARY OF THE INVENTION

The apparatus according to the present invention for triggering personal protection means has, in contrast thereto, the advantage that a pedestrian protection algorithm and a pre-crash algorithm are linked to one another in such a way as to improve the triggering of personal protection means that is effected by these two algorithms. In particular, the sensor signals and also the interim results are mutually exchanged in this context. This results in better, more accurate, and more optimally timed triggering of personal protection means. "Personal protection means" are to be understood here as occupant restraint means such as an airbag, belt tensioner, or rollover bar, but also as pedestrian protection means such as external airbags or the adjustable front opening hood.

The apparatus according to the present invention improves, in particular, the determination of the starting time of the algorithms. The predicted impact time is made available by the pre-crash system to the pedestrian protection algorithm. This allows the pedestrian protection system to supply to the pre-crash algorithm in return, as an input variable, the contact time ascertained more precisely, more reliably, and more robustly by the pedestrian protection system. This contact time, calculated in this fashion, generally agrees better with the actual time than does the time predicted by the pre-crash system. The result, for the pre-crash system, is improved calculation of the impact velocity. The latter can be supplied back to the pedestrian protection system, so that the mutual utilization of information for both systems ultimately results in a more precise, more robust, and therefore more reliable activation decision.

The impact velocity in particular is very useful for determining the impact severity, which then determines which personal protection means need to be activated, or at what intensity. The pedestrian protection algorithm can of course also be used in the context of a different impact, for example with another vehicle or a wall. When such objects are recognized, however, pedestrian protection means are not activated, but instead only the occupant restraint means. As a result of the data exchange between the pre-crash algorithm and the pedestrian protection algorithm, the apparatus according to the present invention makes an improved impact velocity available to these two algorithms.

It is particularly advantageous that the signal of the pre-crash algorithm indicates a first estimate of the impact time. With this estimate, the pedestrian protection algorithm can then better determine its starting point, for example in order to lower the noise threshold correspondingly. As presented above, the pedestrian protection algorithm then sends the impact time back to the pre-crash algorithm so that the latter can better determine the impact velocity. The pre-crash algorithm can also lower its noise threshold as a function of the impact time. Since it is known from analysis of the surroundings that the initially weak acceleration signal is not noise but rather a signal caused by an impact, the noise threshold can be decreased, with the result that the beginning of the pre-crash algorithm is closer to the contact time.

DETAILED DESCRIPTION

Pre-crash systems and pedestrian protection systems have already been developed, but they operate independently of one another. The pedestrian protection system, for example, evaluates the signal from a contact sensor suite to identify whether the object in question is a person—i.e., for example, a pedestrian, an inline skater, or a bicyclist—or another object, for example a trash can, a road sign, or a tree. This determines whether or not the pedestrian protection system is activated. The pre-crash system senses the surroundings in front of the vehicle, independently of the pedestrian protection sensor suite, using e.g. photonic mixing device (PMD), ultrasonic, radar, lidar, or video sensors and any combinations thereof. If an object enters the observation field, the pre-crash system then predicts the impact time, the impact velocity, impact offset, and/or impact angle parameters likewise being indicated. These predicted data are then used as input variables to calculate decision to trigger the restraint means.

It is provided according to the present invention that the pre-crash algorithm and the pedestrian algorithm exchange data with one another in order to enhance the performance of both algorithms, and thus to arrive at an improved triggering decision for the personal protection means.

Figure 1:
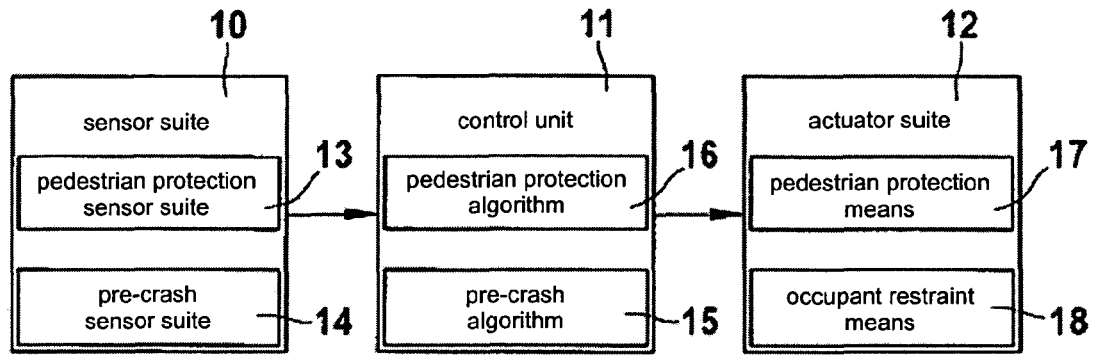
FIG. 1 is a block diagram of the apparatus according to the present invention.

FIG. 1 shows, in a block diagram, the basic construction of the apparatus according to the present invention. A sensor suite 10 has a pedestrian protection sensor suite 13 and a pre-crash sensor suite 14. Pedestrian protection sensor suite 13 is preferably installed in the front of the vehicle. These can be, for example, acceleration sensors or contact sensors such as a piezo cable or tube. Optical sensors are also possible here. Pre-crash sensor suite 14 can have a variety of radar sensors, ultrasonic sensors, light sensors, or video sensors. Any combinations of these sensors are also possible here. Pre-crash sensor suite 14 monitors the vehicle's surroundings. Sensor suite 10 is connected via a data output to a control unit 11. In control unit 11, pedestrian protection algorithm 16 and pre-crash algorithm 15 are calculated on a processor. In addition, it is furthermore possible for different control devices to be present for the pedestrian protection system and pre-crash system. In the interest of simplicity, the sensor suite and algorithm for evaluating acceleration signals are not depicted here. An occupant sensor suite is also omitted in the interest of simplicity.

Pedestrian protection algorithm 16 determines whether pedestrian protection means, such as external airbags or the adjustable front shroud or other actuators, are triggered as a function of the signals from the pedestrian protection sensor suite and pre-crash sensor suite. The pre-crash algorithm is provided for the triggering of occupant restraint means 18. Control unit 11 is therefore connected to actuator suite 12, which encompasses pedestrian protection actuator suite 17 and occupant restraint means 18. According to the present invention, pedestrian protection algorithm 16 and pre-crash algorithm 15 exchange data with one another in order to improve the performance of both algorithms. Pre-crash algorithm 15 begins the process by transferring the predicted impact time to the pedestrian protection algorithm. Pedestrian protection algorithm 16 then transmits to the pre-crash algorithm the impact time measured by contact. This makes it possible, in particular, for pre-crash algorithm 15 to determine the impact velocity very precisely. From the impact velocity and the acceleration signal, the type of crash and the crash severity can be derived, so that the triggering times for occupant restraint means 18 can be determined very accurately. The triggering times can be later for a minor crash than for a severe crash. The intensity of the restraint means can also thus be adjusted, when possible, in accordance with the severity of the accident.

The pre-crash system observes the vehicle's surroundings using pre-crash sensor suite 14. If an object is sensed by the sensor suite prior to the crash, the contact time between object and vehicle is predicted. This contact time predicted by the pre-crash system is delivered to the pedestrian protection system, and in particular to pedestrian protection algorithm 16, so that from then on the noise threshold in the pedestrian protection algorithm can be reduced, and so that pedestrian protection algorithm 16 can be started. A reduced noise threshold offers the advantage, as compared with one that is not reduced, that the contact time ascertained by way of the reduced noise threshold generally corresponds better to the actual time. This additional utilization of the contact signal yields a calculated contact time that generally agrees better with the actual time than does the time predicted by the pre-crash system.

This contact time ascertained by pedestrian protection algorithm 16 is transferred to pre-crash algorithm 15 so as thereby either to start pre-crash algorithm 15 directly, or to reduce the noise threshold relevant to pre-crash algorithm 15. The contact time calculated by the pedestrian protection algorithm is additionally used to increase the precision of the relative velocity predicted by the pre-crash system. From a knowledge of the predicted relative velocity and a knowledge of the distance, it is possible to predict the impact time. If the actual measured contact time is earlier or later, the predicted relative velocity can be corrected accordingly. The information from the contact sensor of pedestrian protection sensor suite 13 is helpful here. The improved information regarding the relative velocity is used by both the pre-crash and pedestrian protection algorithms 15, 16 to obtain a more robust and more precise triggering decision for pedestrian protection actuator suite 17 and occupant restraint means 18.

Figure 2:
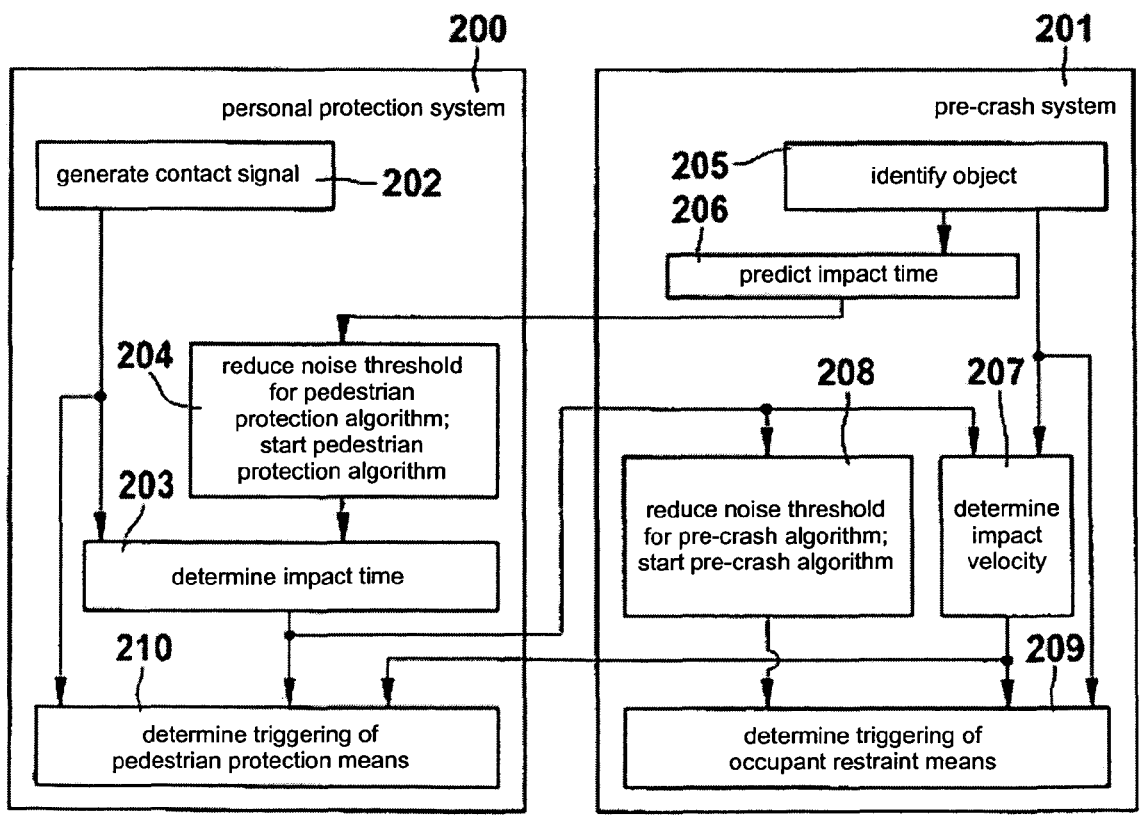
FIG. 2 is an information flow chart.

FIG. 2 shows, in an information flow diagram, the procedure executed by the apparatus according to the present invention. Two systems are present here: pedestrian protection system 200 on the one hand, and pre-crash system 201. In method step 205, pre-crash system 201 identifies an object using pre-crash sensor suite 14, and in method step 206 predicts an impact time therefrom. This datum is delivered to pedestrian protection system 200 and in that context to pedestrian protection algorithm 16. Pedestrian protection algorithm 16 is therefore started in method step 204; a reduction in the noise threshold for pedestrian protection algorithm 16 can also be performed here. In method step 202, a contact signal indicating impact of the object or person is generated via a contact sensor, for example a piezoelectric sensor. In method step 203, this signal and the predicted impact time are used by the pedestrian protection algorithm to lower the noise threshold at that point in time and thereby to determine the impact time more accurately. This datum (the impact time) is transmitted back to pre-crash system 201. With this, in method step 208, a reduction in the noise threshold can be effected and pre-crash algorithm 15 can be started. In particular, an improved impact velocity can thereby be determined in method step 207, in which context the data from pre-crash sensor 205 are of course also used. In method step 209, the pre-crash algorithm then determines the triggering of occupant restraint means 18, taking into account the signal of pre-crash sensor suite 14 from method step 205 and the improved relative velocity from method step 207. The relative velocity from method step 207 is also sent back to the pedestrian protection algorithm in order to activate the pedestrian protection means in method step 210. Also incorporated into this activation, however, are the impact time from method step 203 and the contact signal from method step 202.

Figure 3:
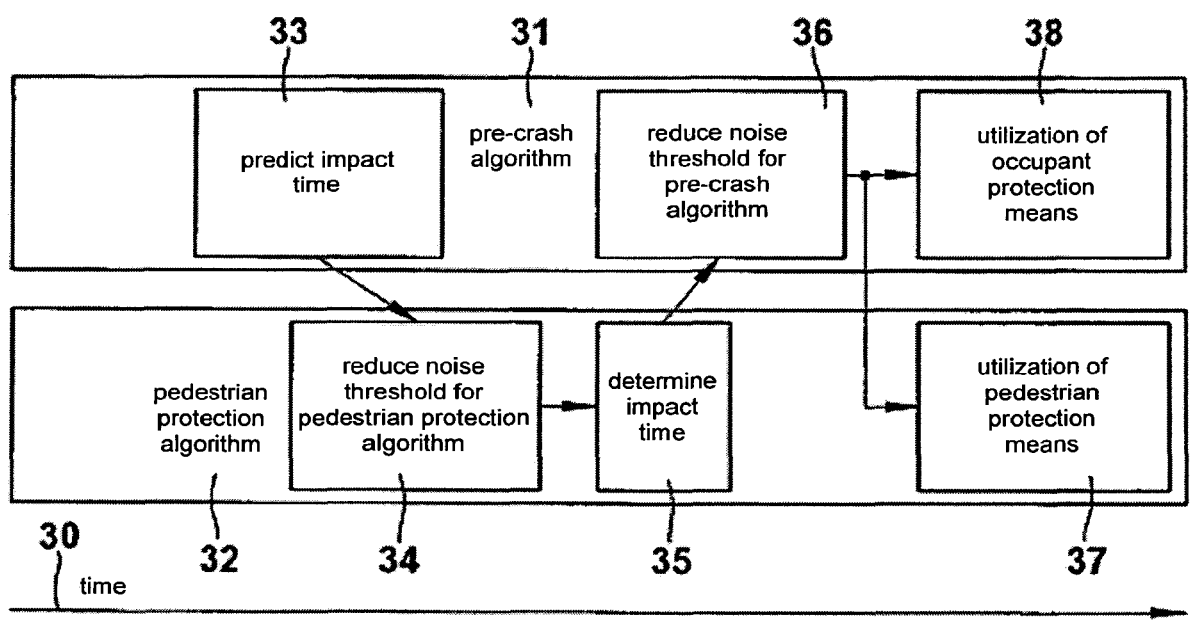
FIG. 3 is a time sequence diagram.

FIG. 3 shows, in a sequence diagram as a function of time, the exchange of data and the activation of the restraint means. Only abscissa 30, which indicates the passage of time, is plotted here. Upper bar 31 represents pre-crash algorithm 15, and lower bar 32 represents pedestrian protection algorithm 16. Firstly, at time 33, the impact time is predicted by pre-crash algorithm 15. This time is delivered to pedestrian protection algorithm 16 so that it can thereby lower its noise threshold. This occurs at time 34. From this, at time 35, pedestrian protection algorithm 16 determines the impact time, also taking into account here the contact signal of the pedestrian protection sensor suite. In block 36 the impact time is then once again delivered to pre-crash algorithm 15, which as a result can lower its noise threshold and determine the impact velocity. With the impact velocity, the decision as to utilization of the occupant protection means or utilization of the pedestrian protection means can then be made at times 37 and 38, respectively.

What is claimed is:

1. An apparatus for triggering a personal protection device, comprising:
    a surroundings sensor suite;
    a contact sensor suite;
    a pre-crash system having a pre-crash algorithm that takes into account signals from the surroundings sensor suite for triggering an occupant protection arrangement;
    a pedestrian protection system having a pedestrian protection algorithm that takes into account signals from the contact sensor suite for triggering a pedestrian protection arrangement; and
    at least one arrangement for influencing the pedestrian protection algorithm as a function of a first signal of the surroundings sensor suite, for influencing the pre-crash algorithm as a function of a second signal of the pedestrian protection algorithm that takes into account a third signal of the contact sensor suite, and for triggering the personal protection device as a function of a fourth signal of the pedestrian protection algorithm and a fifth signal of the pre-crash algorithm;
    wherein the personal protection device includes at least one of the occupant protection arrangement and the pedestrian protection arrangement.

2. The apparatus according to claim 1, wherein the first signal indicates an estimate of an impact time.

3. The apparatus according to claim 1, wherein the second signal indicates an impact time.

4. The apparatus according to claim 1, wherein the pre-crash algorithm determines an impact velocity as a function of the second signal.

5. The apparatus according to claim 1, wherein the pedestrian protection algorithm adjusts a first noise threshold as a function of the first signal.

6. The apparatus according to claim 1, wherein the pre-crash algorithm adjusts a second noise threshold as a function of the second signal.

7. The apparatus according to claim 1, wherein the third signal is a contact signal.

8. The apparatus according to claim 1, wherein the apparatus provides an impact velocity for the pre-crash algorithm and for the pedestrian protection algorithm.

9. The apparatus according to claim 1, wherein the first signal indicates an estimate of an impact time, wherein the second signal indicates an impact time, wherein the pre-crash algorithm determines an impact velocity as a function of the second signal.

10. The apparatus according to claim 9, wherein the pedestrian protection algorithm adjusts a first noise threshold as a function of the first signal.

11. The apparatus according to claim 9, wherein the pre-crash algorithm adjusts a second noise threshold as a function of the second signal.

12. The apparatus according to claim 9, wherein the third signal is a contact signal.

13. The apparatus according to claim 9, wherein the apparatus provides an impact velocity for the pre-crash algorithm and for the pedestrian protection algorithm.

14. The apparatus according to claim 9, wherein the pedestrian protection algorithm adjusts a first noise threshold as a function of the first signal, and wherein the pre-crash algorithm adjusts a second noise threshold as a function of the second signal.

15. The apparatus according to claim 14, wherein the third signal is a contact signal.

16. The apparatus according to claim 14, wherein the apparatus provides an impact velocity for the pre-crash algorithm and for the pedestrian protection algorithm.

17. The apparatus according to claim 14, wherein the third signal is a contact signal, and wherein the apparatus provides an impact velocity for the pre-crash algorithm and for the pedestrian protection algorithm.

* * * * *